United States Patent [19]

Krumwiede

[11] 4,349,367
[45] Sep. 14, 1982

[54] METHOD OF RECOVERING WASTE HEAT FROM FURNACE FLUE GASES USING A GRANULAR HEAT EXCHANGE MEANS

[75] Inventor: John F. Krumwiede, Blawnox, Pa.

[73] Assignee: PPG Industries, Inc., Pittsburgh, Pa.

[21] Appl. No.: 249,311

[22] Filed: Mar. 31, 1981

[51] Int. Cl.³ .............................................. C03B 3/00
[52] U.S. Cl. .......................................... 65/27; 65/62; 65/134; 65/335; 165/111; 209/11; 209/129
[58] Field of Search .................. 65/27, 28, 62, 134, 65/335; 165/111; 209/11, 45, 47, 129, 130, 133, 285

[56] References Cited

U.S. PATENT DOCUMENTS

| | | | |
|---|---|---|---|
| 1,663,863 | 3/1928 | Royster et al. | 65/27 |
| 1,815,890 | 7/1931 | Brockway | |
| 2,990,912 | 7/1961 | Cole | 183/7 |
| 3,549,135 | 12/1970 | Wynne et al. | 263/15 |
| 3,726,697 | 4/1973 | Mod et al. | 106/52 |
| 3,753,743 | 8/1973 | Kakuda et al. | 106/52 |
| 3,788,832 | 1/1974 | Nesbitt et al. | 65/134 |
| 3,880,629 | 4/1975 | Dulin et al. | 65/27 |
| 3,880,639 | 4/1975 | Bodner et al. | 65/134 |
| 3,953,190 | 4/1976 | Lange | 65/335 |
| 4,099,953 | 7/1978 | Rondeaux et al. | 65/335 |
| 4,126,435 | 11/1978 | Reese | 55/474 |
| 4,144,359 | 3/1979 | Zahedi et al. | 427/39 |
| 4,225,332 | 9/1980 | Tsay | 65/27 X |

FOREIGN PATENT DOCUMENTS 54-33249  10/1979  Japan ................................. 65/134

Primary Examiner—Arthur D. Kellogg
Attorney, Agent, or Firm—Dennis G. Millman

[57] ABSTRACT

Granular heat exchange medium is employed to recover waste heat from a combustion furnace, particularly a glass melting furnace, and the heated medium is then employed to pre-heat combustion air entering the furnace. A bed of granular heat exchange medium also may remove particulate emissions from the exhaust gas.

25 Claims, 5 Drawing Figures

METHOD OF RECOVERING WASTE HEAT FROM FURNACE FLUE GASES USING A GRANULAR HEAT EXCHANGE MEANS

BACKGROUND OF THE INVENTION

The present invention relates to transfer of waste heat from exhaust gas to incoming combustion air in a combustion furnace. Preferred embodiments also achieve reduction of particulate emissions. The invention has particular utility in the melting of glass, but is applicable to any large-scale combustion furnace.

Commercial production of glass in a continuous melting furnace conventionally involves feeding raw glass batch materials into an opening at one end of an elongated melting furnace while withdrawing melted glass through an opening at the opposite end of the furnace and forming it into the desired product, such as a flat glass ribbon. Flat glass batches typically include sand (silica), soda ash (sodium carbonate), limestone (calcium carbonate), dolomite (calcium carbonate and magnesium carbonate), rouge (iron oxide), a source of sulfur such as salt cake, gypsum, slag, etc. as a fining agent, and sometimes the raw materials aplite, feldspar, or nepheline syenite. It is also known to use caustic soda in place of soda ash. Minor amounts of additional materials such as colorants (e.g., iron oxide) may sometimes be used as well. These batch ingredients, in finely divided, dry, particulate form, are blended together and usually wetted with water (or caustic soda solution) prior to being introduced into the furnace. Additionally, a substantial amount of cullet (broken or crushed glass) is mixed with the batch ingredients, in amounts usually ranging from about 20% to about 60% of the total glass-making materials being fed to the furnace.

In the melting furnace, the major source of thermal energy for melting the raw ingredients into molten glass is usually the combustion of fossil fuel (natural gas or fuel oil) in flames above the melting mass. Exhaust gases leave the melting chamber at very high temperatures, typically on the order of 1400° C. to 1700° C. Much of the heat in the exhaust gases may be recovered in regenerators or recuperators, but typically a substantial amount of thermal energy is wasted. It is not uncommon to find exhaust gases being discharged to a smokestack at about 300° C. to 800° C. Recovery of waste heat by conventional heat exchange technology has been found to be generally economically unfavorable, and has been hampered by the corrosiveness of glass furnace exhaust and the presence of particulate emissions that tend to clog heat exchange means.

The use of sulfur compounds in the melting process is a major contributor to particulate emissions from a glass melting furnace. At glass melting temperatures, sulfur compounds such as salt cake dissociate or volatilize, resulting in the emission of sulfur-containing gases which pass from the furnace in the exhaust gas stream. A portion of these sulfurous gases recombine with sodium vapor within the furnace or exhaust passages to form particulate sodium sulfate which comprises the major portion of the particulate emissions from glass furnaces, particularly flat glass furnaces. In some localities, regulations as to maximum allowable particulate emission rates have restricted operations of some glass manufacturers. Many widely varying proposals for reducing particulate emissions from glass furnaces have been made in the prior art, but none is entirely satisfactory.

Perhaps the most straightforward approach to lowering the amount of particulates in glass furnace emissions is to treat the exhaust gas stream to remove the particulates such as by electrostatic precipitators or scrubbers. However, such approaches entail high capital and operating costs and return no improvement to the melting process. Accordingly, it has been suggested that the exhaust gas stream contact glass batch materials to strip particulates from the exhaust as well as preheat the batch materials so as to recover heat being lost in the exhaust gas stream. Examples of such an approach are disclosed in U.S. Pat. Nos. 3,726,697; 3,788,832; 3,880,639; and 3,953,190. Furthermore, these proposals return the sulfate material to the melting process, thereby saving on batch costs.

Unfortunately, most arrangements for contacting batch materials with exhaust gas have two major drawbacks: the batch must be agglomerated, and the particulate removal efficiency is dependent on bed size. Agglomerating the batch, usually by pelletizing or briquetting, is required in order to prevent the fine batch materials from being entrained by the exhaust gas stream. However, the cost of agglomerating the batch can substantially reduce and even exceed the economic gain from the heat recovery. Also, it has been found that the use of agglomerated batch is not always successful at avoiding dusting since abrasion in a moving bed at high temperatures can cause the loss of fine material from the surfaces of the agglomerates. When these fine materials are entrained in the exhaust gas stream, they contribute to the particulate emissions problem. Secondly, since beds of batch agglomerates remove particulates from the exhaust gas stream primarily by filtration, obtaining the desired degree of particulate removal can sometimes require undesirably large bed depths. A large bed depth is undesirable not only from the standpoint of equipment size, but more importantly, because of the accompanying high pressure drop which may require the use of additional blower means which likewise may substantially negate the economic advantages of heat recovery.

Preheating of loose glass batch material by contact with exhaust gases in fluidized beds has been proposed (e.g., U.S. Pat. No. 4,099,953). However, predicted separation of fine materials from the relatively coarse materials of the batch and entrainment of the fine materials in the exhaust gas stream have discouraged use of the fluidized bed approach to preheat glass batch.

In U.S. Pat. No. 3,753,743, there is disclosed a method of recovering waste heat from a glass furnace exhaust stream by passing the exhaust gas through a bed of cullet. The heated cullet is mixed with a caustic soda containing batch slurry in order to dry the slurry prior to feeding to the melting furnace. The patent includes no mention of particulate removal nor does it contemplate any use for heated cullet apart from the slurry drying function disclosed. It appears that little, if any, thermal benefit to the melting process is obtained by the method disclosed in the patent.

An arrangement is shown in U.S. Pat. No. 3,880,629 for returning collected particulates from a bag house to a glass melting furnace, but no attempt is made to recover waste heat.

The use of beds of electrostatically charged solids as the media for collecting particulates from gas streams is disclosed in U.S. Pat. Nos. 2,990,912; 4,126,435 and 4,144,359. None of these relates to glass melting processes nor do they deal with recovery of waste heat.

SUMMARY OF THE INVENTION

In the present invention, combustion furnace exhaust is passed through a first bed of granular heat exchange medium so as to heat the medium, and the heated medium is passed to a second heat exchange bed where air being supplied to the furnace for combustion is passed through the medium to preheat the air. In this manner, a portion of the waste heat is returned to the furnace by way of incoming combustion air, thereby improving the thermal efficiency of the furnace.

The first heat exchange bed may serve to remove particulates as well as heat from the exhaust gas. In that case, particulates carried by the medium leaving the first heat exchange bed may be removed before the medium enters the second heat exchange bed to avoid re-entraining the particulates in the combustion air.

Alternatively, the exhaust gas stream may have particulate emissions removed therefrom prior to passage through the first heat exchange bed. In one embodiment of the invention, the preliminary particulate removal is carried out by another granular bed in which the medium is cullet, whereby the cullet and entrained particulate material may be fed to the melting furnace.

In each of the embodiments, the collection of particulates by the granular media may be enhanced by electrostatic means.

Because the present invention returns waste heat to the glass melting process via the combustion air, it avoids the dusting and segregation problems of prior art attempts to recover heat with the batch materials. Additionally, the corrosion and clogging of heat transfer surfaces are avoided by the use of a recirculating granular heat transfer medium. Also, the granular heat transfer medium presents a large heat transfer surface area compared to conventional heat exchangers. At the same time, significant reductions of particulate emissions can be attained.

THE DRAWINGS

DETAILED DESCRIPTION

Figure 1:
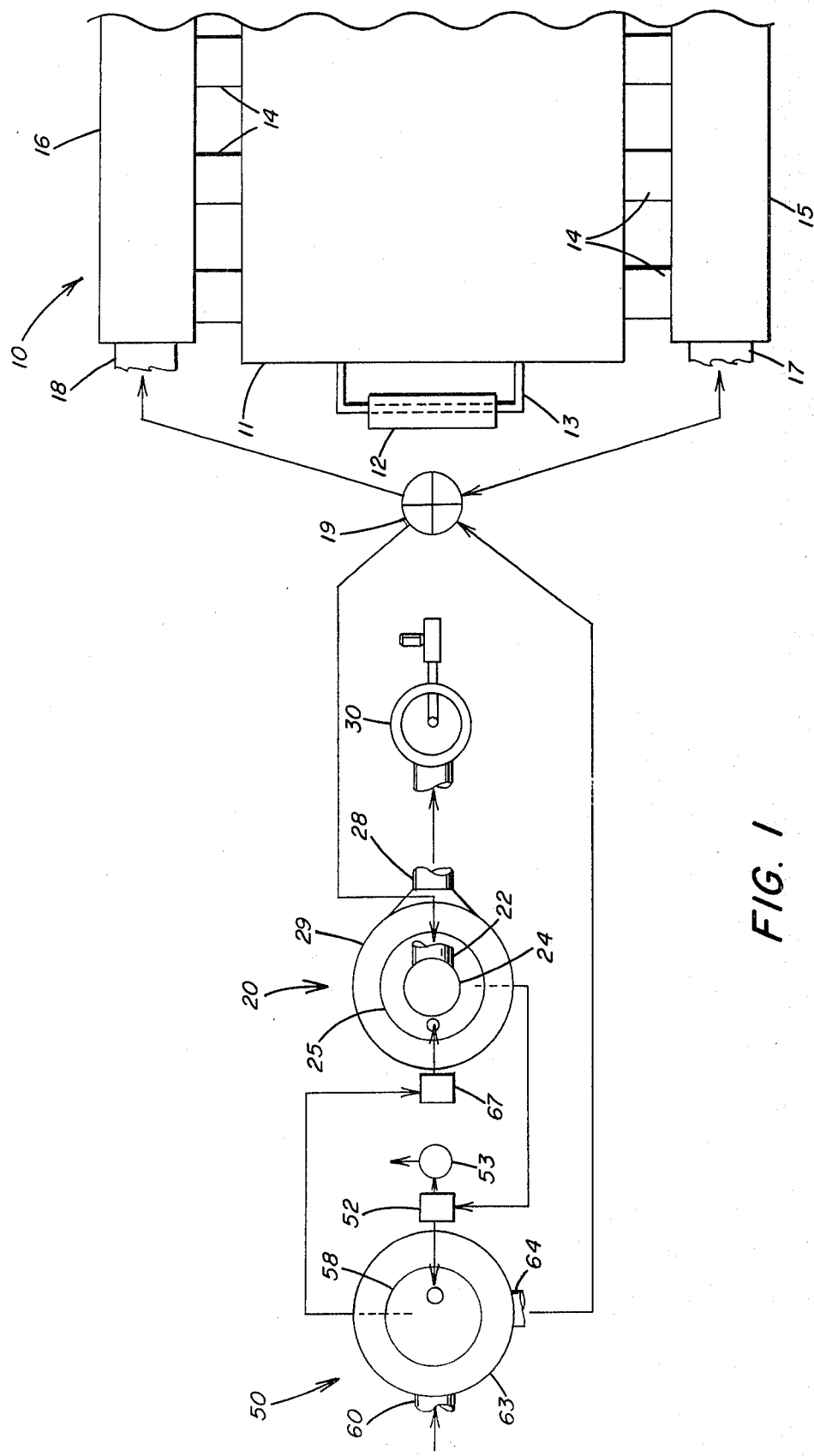
FIG. 1 is a schematic flow chart in plan view of one embodiment of the present invention employing separate heat exchange vessels for removing particulates and preheating combustion air.
Figure 2:
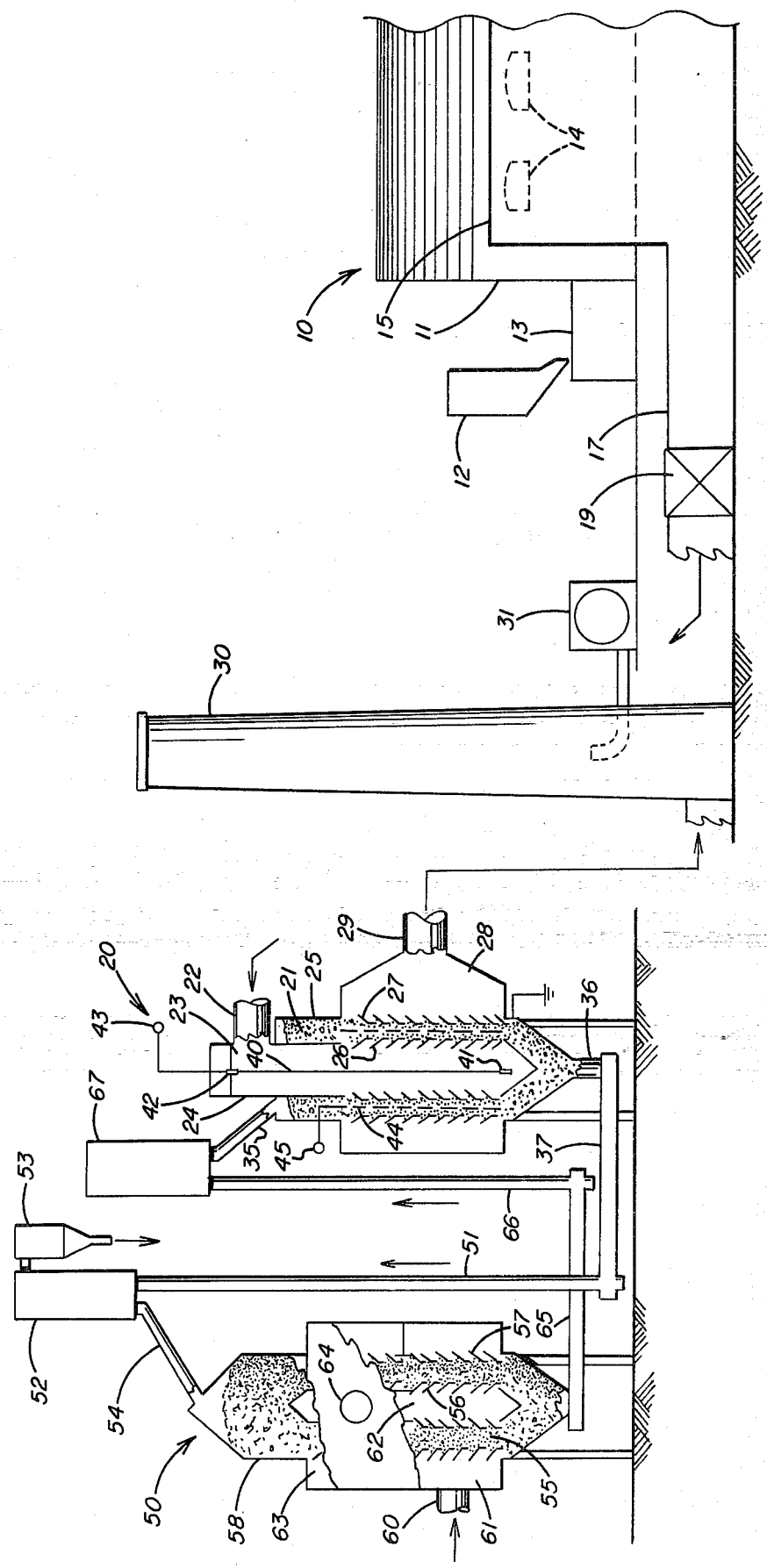
FIG. 2 is a schematic side view of the arrangement of FIG. 1 with the heat exchange vessels shown partly broken away.

The invention will be described in detail with reference to a particular embodiment involving a glass melting operation. In FIGS. 1 and 2 there is shown schematically the inlet end of a continuous glass melting furnace 10. The type of furnace shown is that conventionally employed in the commercial melting of flat glass, in which it is contemplated that the invention will find particular utility. However, it should be understood that the invention is applicable to other types of glass melting operations, as well as other combustion furnaces.

The melting furnace 10 is comprised of a main melter 11 in which is contained a pool of molten glass. Raw glass batch materials and cullet are fed from a hopper 12 into an inlet extension 13 of the melter to form a layer on the surface of the pool of molten glass that extends into the main melter portion 11. A plurality of ports 14 are spaced along opposite sidewalls of the furnace. During one portion of the firing cycle, the ports along one sidewall serve as burners while exhaust gases escape through the ports on the opposite sidewall. The ports communicate the interior of the melter 11 with a right hand regenerator 15 and a left hand regenerator 16. The exhaust gases pass through the ports on the exhaust side into one of the regenerators wherein heat from the exhaust gases is partially recovered by storage in a checker packing. When firing is reversed, incoming combustion air passes through the checker packing and is pre-heated thereby. As depicted in FIGS. 1 and 2, the firing is taking place from the left hand regenerator 16 and exhaust is passing through the right hand regenerator 15. From the regenerators, the exhaust gases are conventionally passed to a smokestack through a respective one of the flues 17 or 18. Incoming combustion air likewise is passed through the opposite flue 17 or 18. Control of the periodic flow reversals is effected by a valving arrangement 19 shown schematically. Considerable heat remains in the exhaust gas stream after it leaves the regenerators, exhaust gas temperatures in the range of 300° C. to 800° C. being typical. The exhaust gas temperature varies not only from furnace to furnace in accordance with the capacity and design of the melter and regenerators, but also varies with time during each firing cycle.

In the present invention, as shown diagrammatically in FIGS. 1 and 2, at least a portion of the exhaust gas stream from the furnace 10 is directed to a gas/solid contact vessel 20 wherein a bed 21 of granular heat transfer medium is heated by contact with the exhaust gas stream. The gas/solid contact vessel may take a variety of forms, but the concentric annular arrangement shown in the drawings is particularly suitable with the present invention and is a design commercially available from EFB, Inc., Woburn, MA. The vessel 20 may be scaled in accordance with the volume flow rate of the exhaust gases, although at higher throughputs it may become more efficient to employ additional vessels rather than increase the size of one vessel. To treat the entire gas stream from a large scale commercial flat glass furnace, a plurality of vessels 20 operating in parallel would be contemplated.

In the embodient of FIGS. 1 and 2, exhaust gas from the furnace 10 enters the vessel 20 through a conduit 22 to a vertically elongated interior space 23 within an inner cylinder 24. The bed 21 of granular heat exchange material is contained within an annular space between an inner cylinder 24 and an outer cylinder 25. A portion of the annular bed is defined by concentrically arranged sets of louvers 26 and 27 which permit the exhaust gases to pass radially through the heat exchange medium. The exhaust gases then pass to a surrounding manifold 28 and pass from the vessel 20 through a conduit 29 which may lead to a conventional smokestack 30 or other means for discharging the exhaust gas to the atmosphere. Preferably, the pressure drop through the vessel 20 is of sufficiently small magnitude to permit use of existing exhaust gas draft means such as an ejector 31. However, if a greater pressure drop is required, auxiliary draft fan or other means may be employed.

The granular heat exchange medium enters the annular bed 21 from the top by way of a chute 35, and exits the vessel 20 at the bottom through a conduit 36 leading to a conveyor 37 which may be a screw conveyor or preferably a vibratory conveyor that also serves to meter the medium's flow rate along the bed. Preferably, the medium is continuously replenished and removed from the bed so that the bed is in continual downward motion.

The heat exchange medium may be any granular material capable of withstanding the exhaust gas temperatures and relatively inert to the corrosive materials in the exhaust gas. The granules should be reasonably strong so as to withstand recycling without undue attrition, and the medium is preferably an inexpensive material that requires minimal preparation. Accordingly, the preferred material is gravel, although other types of stone aggregates, as well as cullet, fragments of ceramic, or other inorganic refractory materials may be employed. Non-metallic materials are preferred when electrostatic means are employed to enhance particulate collection, but in those embodiments of the invention wherein electrostatic means are not employed, the heat exchange material may be metallic. Media whose individual granules have maximum dimensions in the range of about 2 millimeters to 40 millimeters have been found to be most suitable for use in the present invention. Finer particles can become entrained in the exhaust gas stream, and larger particles tend to detrimentally decrease the density of the granular bed in the contacting vessel, provide less heat transfer area, and are prone to cause jam-ups. While the particle size range stated above is preferred, design precautions may be taken to permit larger or smaller sized granules to be employed.

The present invention may be utilized for the sake of heat recovery alone, but it is a particular advantage of the present invention that heat recovery and particulate emission control are achieved simultaneously. A portion of the particulates in the exhaust gas stream may be removed during passage through the granular bed 21 even without electrostatic enhancement. However, for greater particulate removal efficiencies, it is preferred that particulate collection be electrostatically enhanced. The electrostatic means may include two separate features: a corona discharge device in the incoming gas stream, and an electric field imposed across the granular bed 21. Each of these electrostatic means may be used independently to enhance particulate collection, but it is particularly advantageous to use both in combination. Referring now to FIG. 2 in particular, a corona discharge device may comprise a vertically extending wire or rod 40 tensioned at the bottom end by a weight 41 and engaged at the upper end by an insulator 42. The corona discharge device is connected by way of electrical connection 43 to a source of high voltage potential, e.g., on the order of 10,000 to 50,000 volts DC. Negative or positive polarity may be applied to the corona discharge, but negative polarity is preferred. The inner cylinder 24 and the louvers 26 are connected to the ground so that an ionizing electric field is established between the corona discharge wire 40 and the surrounding elements of the vessel whereby particulates in the incoming gas stream become electrically charged. It has been found that charging these particulates improves collection efficiency even when the granular bed is not electrified.

The arrangement for imposing an electric field across the granular bed 21 illustrated in FIG. 2 comprises a perforated electrode plate 44, which is in the form of a cylinder and is embedded within the annular bed 21 in the region of the louvers 26 and 27. The electrode plate 44 is connected to a source of high voltage by way of electrical connection 45. The outer cylinder 25 and louvers 26 and 27 are connected to ground. The voltage applied to electrode plate 44 may be alternating current or direct current, although direct current is preferred and may typically be on the order of 5,000 to 10,000 volts. The electric field between the electrode plate 44 and the grounded louvers 26 and 27 polarizes the particles of granular medium therebetween so as to produce positively and negatively charged regions at the opposite ends of each granule. These charged regions attract and retain the previously charged particulates in the gas stream passing through the bed. Although the corona discharge device is preferably employed to charge the particulates, electrifying the bed alone enhances particulate collection even without use of the corona discharge, since particulates in a moving gas stream naturally possess some charge.

The direction of exhaust gas flow through the vessel 20 as well as any of the other gas/solid contact vessels which are described hereinafter, may be in the opposite direction from that shown in the drawings. However, when a corona discharge device is being employed, the corona discharge should be located on the inlet side of the granular bed.

The heated medium from the vessel 20 is conveyed to a heat exchange vessel 50. As shown in FIGS. 1 and 2, the vessels 20 and 50 are side-by-side, but the vessel 20 may be mounted above vessel 50 so that the medium will flow by gravity from one vessel to the other. A similar variation will be discussed in greater detail in connection with FIG. 4.

The heated medium leaving vessel 20 carries particulates removed from the exhaust gas stream. Before the medium is brought into contact with incoming combustion air, the particulates are removed from the medium. For example, the medium may be subjected to vibratory screening prior to being charged into the heat exchange vessel 50. However, in the embodiment of FIGS. 1 and 2, a pneumatic lift 51 elevates the medium to the top of vessel 50 which inherently agitates the medium sufficiently to separate the particulates therefrom. The medium is collected in a surge hopper 52 and particulate dust is drawn out of the hopper 52 and collected by means of a cyclone separator 53. The collected particulate may be recycled to the melting furnace. The medium is fed to the upper end of vessel 50 from the hopper 52 by way of a chute 54.

The means for contacting incoming air with the heated medium may take a variety of forms, but the preferred embodiment depicted in the drawings is again the concentric arrangement whereby the medium is contained in an annular bed 55. The medium is retained between concentric rows of inner and outer louvers 56 and 57, respectively. A cylindrical section 58 extends above the louvers for holding the incoming medium.

The heat exchange vessel 50 shown in FIG. 2, is a double pass heat exchanger, which is an optional feature. It should be understood that a single pass arrangement similar to that of vessel 20, may be employed for the heat exchanger. Also, to increase the efficiency of heat transfer from the medium to the incoming air, a heat exchanger with more than two passes may be employed. In the embodiment illustrated, relatively cool incoming air enters the heat exchanger 50 through a conduit 60 into a manifold 61 surrounding the lower portion of the louvers. The air passes from the manifold 61 through the granular bed 55 wherein heat from the medium is transferred to the air. The air then passes to a vertically elongated cylindrical central passage 62. In the passage 62 the air is free to pass vertically to the second stage of the heat exchanger where the air makes its second pass through the bed 55 to a second manifold 63. The air, now preheated by its contact with the medium, passes from the manifold 63 through a conduit 64 which carries the preheated air to the conventional combustion system of the furnace 10 by way of the flow control means 19 and one of the flues 17 or 18. For the sake of conserving heat, it is advantageous for the conduit 64, as well as the vessels 20 and 50, and the medium conveying means associated therewith, to be insulated.

As the heat exchange medium passes downwardly in the bed 55, its stored thermal energy is expended to the air passing through the bed and the medium is discharged through a bottom opening to a screw conveyor 65 or the like. The medium is then raised by a pneumatic lift 66 or other conveyor means to a surge hopper 67 from which the medium is fed back to the vessel 20 to be again heated by the exhaust gas. Optionally, any dust may be removed from hopper 67 by another cyclone separator.

After partial heat recovery by a regenerator system, glass furnace exhaust gases are typically available at temperatures in the range of about 300° C. to 800° C. Without regenerator systems, much higher temperatures are prevalent. For the sake of thermal efficiency, any temperature increase in the incoming combustion air is advantageous, but from an economic standpoint, a substantial temperature increase, for example, to about 200° C. or more, would be desirable. In that case, the heat exchange medium should, of course, be heated to a temperature higher than the desired air temperature. The heat exchange medium flow rate should be selected so as to provide sufficient residence time to each portion of the medium in the contact vessel 20 so as to heat the medium to the desired temperature, for example, above 200° C., preferably above 300° C. Relatively slow medium flow rates are preferred to maximize particulate collection in the vessel 20, in which case the temperature of the medium leaving the vessel 20 will approach that of the exhaust gas leaving the vessel.

Figure 3:
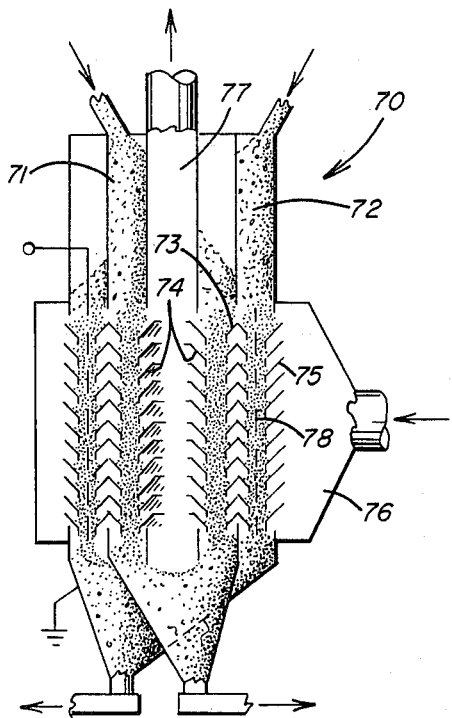
FIG. 3 is a cross-sectional view of an alternate embodiment of heat exchange vessel with concentrically arranged granular beds, wherein particulates are removed and granular heat exchange medium is heated in separate stages within a single vessel.

An alternate embodiment of a heat exchange vessel is shown in FIG. 3. There, vessel 70 is designed to clean the exhaust gases of particulates before the gases contact the heat transfer medium, thereby eliminating the need to remove particulates from the heated medium prior to contact with combustion air. The vessel 70 includes an inner annular bed 71 of heat transfer medium and a concentric, preferably contiguous annular bed 72 of granular particulate removing material. The particulate removing material is preferably a feed material such as cullet or pelletized batch, so that after passing through the vessel 70 the material, along with the deposited particulates, may be fed to the melting furnace. The heat transfer medium of bed 71 may be the same relatively inert materials described above, preferably gravel. In the gas flow section, the inner and outer beds 71 and 72 are separated by a set of double louvers 73 and are otherwise contained by louvers 74 and 75. Hot exhaust gases entering manifold 76 pass through both beds and leave the vessel through a central tubular passage 77. Within the particulate removing bed there may be a perforated cylindrical electrode 78 for imposing an electric field across the bed so as to enhance particulate removal. The incoming exhaust gas stream may be ionized by a corona discharge (not shown) in the manifold 76. The relative position of the beds and direction of gas flow may be reversed from that shown in FIG. 3.

Figure 4:
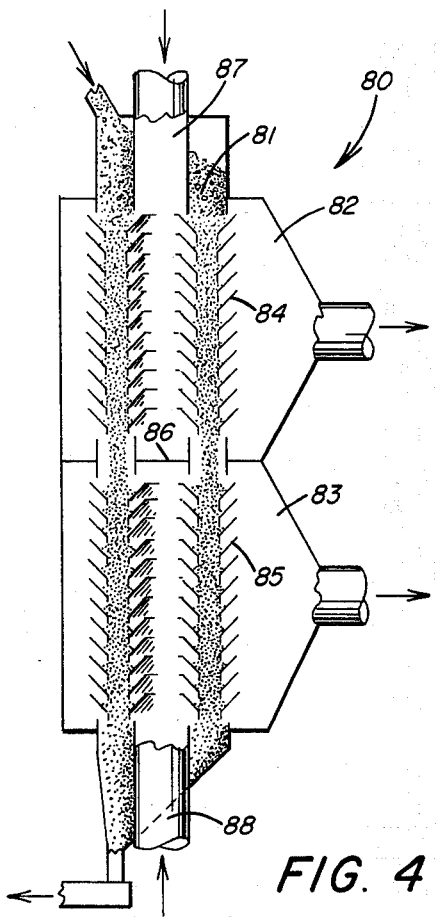
FIG. 4 is another embodiment of heat exchange vessel incorporating a granular medium heating section and a combustion air reheating section with a unitary vessel, vertically extending, granular medium bed.

Another alternative heat exchange vessel arrangement is shown in FIG. 4. In this embodiment, a single annular bed of heat exchange material 81 extends through two vertically superimposed heat exchange stages, the first transferring heat from the exhaust gases to the medium, the second transferring heat from the medium to combustion air. An exhaust gas manifold 82 and a separate combustion air manifold 83 surround respective louvered portions 84 and 85 of the bed 81. A partition 86 separates the manifolds 82 and 83. Exhaust gas enters the central tubular passage 87, passes through the upper portion of the bed 81 and escapes, by way of manifold 82. Incoming combustion air enters central tubular passage 88, passes through the lower portion of the bed 81 and escapes through manifold 83. In either, or both sections, the gas flow may be in the opposite direction. The heat exchange medium moves downwardly in the bed 81 through both sections by gravity, thereby eliminating the need for one of the elevators. The arrangement as shown in FIG. 4 is not provided with means for removing particulates from the medium between the heat exchange sections, and therefore the particulates may be removed from the exhaust gas stream before entering the vessel 80, or the arrangement should be limited to use in applications where particulates are not a concern.

In another mode of operation for the FIG. 4 embodiment, the upper heat exchange section may be used to preheat air, and the lower section may be used to heat the granules. The heated granules may be conveyed from the bottom of the bed 81 and subjected to a particulate removal operation as previously described before being fed to the top of the bed. In this manner, the single elevator arrangement of FIG. 4 may incorporate particulate removal.

Figure 5:
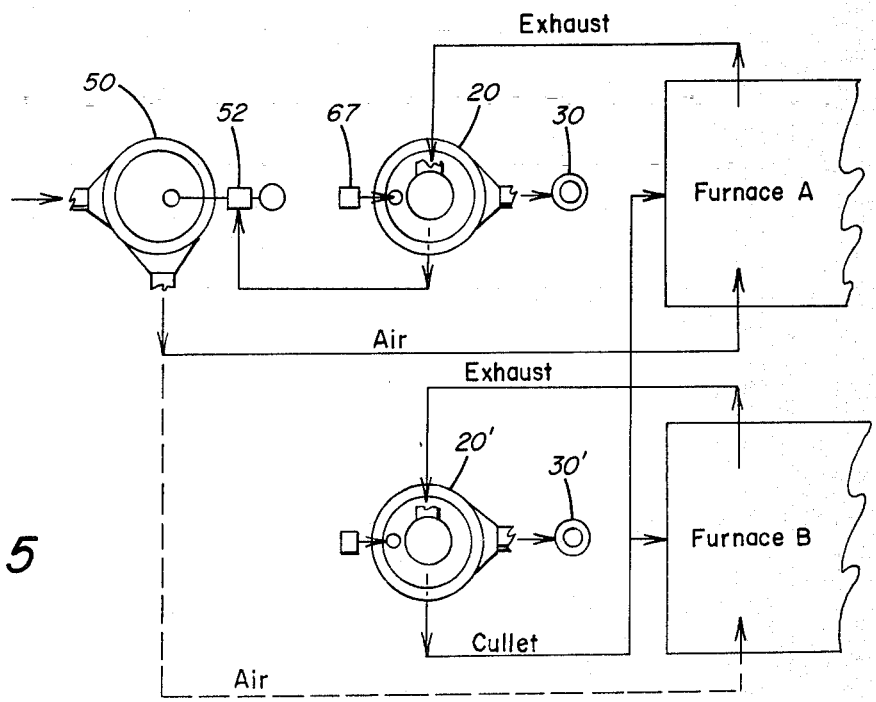
FIG. 5 is a schematic flow chart in plan view of an alternate arrangement whereby heat recovery and particulate removal means of two adjacent glass melting furnaces cooperate to preheat combustion air and cullet for both furnaces.

Frequently, two or more glass melting furnaces are located side-by-side, in which case another mode of carrying out the present invention may involve interacting with a plurality of melting furnaces as shown diagrammatically in FIG. 5. There, the installation includes two glass melting furnaces, furnace A and furnace B, each with a separate heat recovery and particulate removal system. The system associated with furnace A includes heat exchange vessels 20 and 50 as described above in connection with FIGS. 1 and 2 and which operate in the same manner to preheat incoming combustion air for furnace A. Optionally, the system may preheat combustion air for furnace B as well. The exhaust from furnace B is passed to a heat exchange vessel 20' which may be structurally identical to the vessel 20 described above. The granular material in vessel 20' is cullet which is heated by, and removes particulate material from, the exhaust from furnace B.

The heated cullet is fed directly to furnace A and furnace B. Thus, the heat exchange vessel 20' employs the combined cullet input to both furnaces so as to increase the volume of material for heat recovery without the necessity of agglomerating batch materials. The combined systems cooperate to collect particulates from both furnaces and to return heat to the melting processes in both the furnaces by way of solid feed materials and combustion air.

Other variations and modifications as are known in the art may be resorted to within the scope of the invention set forth in the claims which follow.

I claim:

1. A method of recovering waste heat from a combustion furnace to which air and fuel are supplied for combustion and an exhaust gas stream is passed from the furnace, comprising:
    passing at least a portion of the exhaust gas stream through a bed of granules in a first heat exchange vessel so as to heat the granules and extract heat from the exhaust gas, removing the heated granules from the bed and passing the heated granules to a second heat exchange vessel, passing a stream of air into the second heat exchange vessel so as to heat the air by extracting heat from the granules, and passing the heated air from the second heat exchange vessel to the furnace for combustion.

2. In a method of melting glass wherein glassmaking ingredients are fed into a melting furnace, air and fuel are directed into the furnace for combustion therein so as to heat and melt the glassmaking ingredients, and an exhaust gas stream is passed from the furnace, the improvement comprising:
    passing at least a portion of the exhaust gas stream through a bed of granules in a first heat exchange vessel so as to heat the granules and extract heat from the exhaust gas, removing the heated granules from the bed and passing heated granules to a second heat exchange vessel, passing a stream of air into the second heat exchange vessel and into contact with the heated granules so as to heat the air by extracting heat from the granules, and passing the heated air from the second heat exchange vessel to the melting furnace for combustion.

3. The method of claim 1 or 2 wherein the exhaust gas stream passing from the furnace includes particulate materials, and passage of the exhaust gas through the bed of granules in the first heat exchange vessel deposits at least a portion of the particulate material in the bed.

4. The method of claim 1 or 2 wherein the granular material comprises aggregates of stone, ceramic, glass or metal.

5. The method of claim 4 wherein the granular material is gravel.

6. The method of claim 4 wherein the granules are continuously cycled between the first heat exchange vessel and the second heat exchange vessel.

7. The method of claim 3 wherein an electric field is imposed across the bed of granules in the first heat exchange vessel as the exhaust gas is passed therethrough so as to enhance deposition of particulate materials in the bed.

8. The method of claim 7 wherein particulates in the exhaust gas are electrically charged prior to passage through the bed.

9. The method of claim 3 wherein particulates in the exhaust gas are electrically charged prior to passage through the bed.

10. The method of claim 3 wherein the granules after removal from the first heat exchange vessel and prior to entering the second heat exchange vessel, are substantially separated from particulates deposited thereon.

11. The method of claim 1 or 2 wherein the bed of granules in the first heat exchange vessel is maintained in an annular configuration through which exhaust gas flows radially.

12. The method of claim 1 or 2 wherein the heated granules pass through the second heat exchange vessel in an annular configuration through which air flows radially.

13. The method of claim 1 or 2 wherein the granules are removed from the first heat exchange vessel after their temperature exceeds 200° C.

14. The method of claim 13 wherein air is maintained in contact with the heated granules in the second heat exchange vessel for a sufficient time to heat the air to at least 200° C.

15. The method of claim 13 wherein the granules are removed from the first heat exchange vessel when their temperature is at least 300° C.

16. The method of claim 3 wherein a substantial portion of the particulate materials are removed from the exhaust gas before being passed through the first heat exchange vessel.

17. The method of claim 16 wherein the particulate removal is effected by passage of the exhaust gas through a granular filter medium before being passed through the first heat exchange vessel.

18. The method of claim 17 wherein exhaust gas passes through the granular filter medium and the bed of granules within a unitary first heat exchange vessel.

19. The method of claim 18 wherein the granular filter medium and the bed of granules are contained in concentric, annular configurations.

20. The method of claim 17 wherein the granular filter medium is cullet, and the cullet is subsequently fed to a glass melting furnace.

21. The method of claim 1 or 2 wherein the first heat exchange vessel and the second heat exchange vessel are in vertical alignment with one another, and the granules are contained within a continuous annular path as they pass through the first heat exchange vessel and the second heat exchange vessel.

22. The method of claim 21 wherein the first heat exchange vessel overlies the second heat exchange vessel, and the granules pass from the first heat exchange vessel to the second heat exchange vessel by means of gravity.

23. The method of claim 21 wherein the second heat exchange vessel overlies the first heat exchange vessel, and the granules pass from the second heat exchange vessel to the first heat exchange vessel by means of gravity.

24. The method of claim 2 wherein said furnace is adjacent to a second furnace melting glass in the same manner, cullet comprises a portion of the glassmaking ingredients fed to both furnaces, and exhaust gas from the second furnace is brought into contact with the cullet to preheat the cullet before being fed to both furnaces.

25. The method of claim 24 wherein heated air from the second heat exchange vessel is passed to said furnace and the second furnace.

* * * * *